United States Patent [19]

Fontana, Jr. et al.

[11] Patent Number: 5,734,519
[45] Date of Patent: Mar. 31, 1998

[54] CONTACT MAGNETIC RECORDING DISK FILE WITH IMPROVED HEAD ASSEMBLY

[75] Inventors: Robert Edward Fontana, Jr.; Cherngye Hwang, both of San Jose; Vlad Joseph Novotny, Cupertino; Timothy Clark Reiley, Los Gatos; Celia Elizabeth Yeack-Scranton, San Jose; Clinton David Snyder, Los Gatos, all of Calif.

[73] Assignee: International Business Machines Corporation, Armonk, N.Y.

[21] Appl. No.: 37,064

[22] Filed: Mar. 25, 1993

[51] Int. Cl.$^6$ .................................................. G11B 5/255
[52] U.S. Cl. .......................... 360/97.01; 360/103; 360/122
[58] Field of Search ............................. 360/97.01, 122, 360/103, 110, 113, 126, 102, 119, 125

[56] References Cited

U.S. PATENT DOCUMENTS

| | | | |
|---|---|---|---|
| 4,639,803 | 1/1987 | Takeda et al. | 360/103 |
| 4,649,448 | 3/1987 | Nakajima | 360/122 |
| 4,897,747 | 1/1990 | Meunier et al. | 360/122 |
| 5,041,932 | 8/1991 | Hamilton | 360/104 |
| 5,050,027 | 9/1991 | Meunier et al. | 360/122 |
| 5,075,956 | 12/1991 | Das | 360/122 |
| 5,132,705 | 7/1992 | Takeuchi et al. | 346/76 |
| 5,136,775 | 8/1992 | Onoe et al. | 360/122 |
| 5,159,508 | 10/1992 | Grill et al. | 360/103 |
| 5,163,218 | 11/1992 | Hamilton | 360/122 |
| 5,408,373 | 4/1995 | Bajoret et al. | 360/104 |

FOREIGN PATENT DOCUMENTS

| | | |
|---|---|---|
| 0 508 565 A2 | 10/1992 | European Pat. Off. . |
| 55-986773 | 6/1980 | Japan . |
| 8806334 | 8/1988 | WIPO . |

OTHER PUBLICATIONS

H. K. Johnston, II, "Magnetic Read/Write Head", IBM Technical Disclosure Bulletin, vol. 14, No. 4, Sep. 1971, p. 1190.

F. M. Cullen et al., "Wear-Resistant Surface for Magnetic Heads", IBM Technical Disclosure Bulletin, vol. 17, No. 9, Feb. 1974, p. 2635.

*Primary Examiner*—Stuart S. Levy
*Assistant Examiner*—David L. Ometz
*Attorney, Agent, or Firm*—Thomas R. Berthold

[57] ABSTRACT

A contact recording disk file uses an integrated head-suspension assembly having a head carrier with a dual-layer wear pad for contacting the disk during read and write operations. The outer wear layer of the pad is relatively soft and wear prone compared to a harder and more wear-resistant inner layer. The outer wear layer wears away at a relatively rapid rate during initial wear-in of the head carrier. In this manner the head pole pieces, which extend into the wear pad, are rapidly put into contact with the disk, thereby compensating for initial misalignment of the wear pad with the surface of the disk. The inner wear layer then provides wear resistance over the life of the disk file. In the preferred embodiment, both the outer and inner wear layers are formed of essentially amorphous carbon doped with different amounts of hydrogen.

18 Claims, 5 Drawing Sheets

CONTACT MAGNETIC RECORDING DISK FILE WITH IMPROVED HEAD ASSEMBLY

TECHNICAL FIELD

This invention relates to magnetic recording disk files (or "drives"), and in particular to such files of the contact recording type where the recording transducer (or "head") is in contact with the magnetic recording disk during read and write operations.

BACKGROUND OF THE INVENTION

In conventional noncontact rigid disk files, each of the read/write heads is supported on a carrier (or "slider") which rides on a cushion or bearing of air above the surface of its associated disk when the disk is rotating at its operating speed. The slider is connected to a linear or rotary actuator by means of a relatively fragile suspension. There may be a stack of disks in the disk file with the actuator supporting a number of sliders. The actuator moves the sliders radially so that each head may access the recording area of its associated disk surface. In these conventional disk files, the slider is biased toward the disk surface by a small force from the suspension. The slider is in contact with the disk surface from the time the disk file is turned on until the disk reaches a speed sufficient to cause the slider to ride on the air bearing, and again when the disk file is turned off and the rotational speed of the disk falls below that necessary to create the air bearing.

In addition to the above-described conventional magnetic recording disk files, "contact" recording rigid disk files have been proposed wherein the head is in contact or near contact with the disk during read and write operations. Contact recording disk files have the advantage of much closer head-disk spacing and its associated improved writing efficiency, read signal response and corresponding storage densities. In one type of contact recording, sometimes referred to as "dry" contact recording to distinguish it from liquid-bearing contact recording, the disk file uses a head assembly in which the head carrier and suspension are formed as an integrated unit and the head carrier makes physical contact with the disk surface during read and write operations. In this type of head suspension, as described for example in U.S. Pat. No. 5,041,932, a portion of the head pole piece and head carrier actually wear away due to frictional contact with the disk over the life of the disk file. Unfortunately, in this type of disk file it is extremely difficult to assemble the disk file so that the head pole piece is perfectly aligned and in complete contact with the disk. Thus, it is necessary to either develop manufacturing processes with improved tolerances or to operate the disk file for an initial wear-in period to wear down the head carrier a sufficient amount so that the head pole piece is in complete contact with the disk. Because the head carrier is formed of relatively hard material in order to provide a relatively long life for the disk file, this initial wear-in period can be unacceptably long.

Thus, what is needed is a contact recording disk file with an improved head assembly which permits the head pole piece to be quickly and accurately aligned with the disk.

SUMMARY OF THE INVENTION

The invention is a contact recording disk file with a head-suspension assembly having a head carrier with a dual-layer wear pad. The outer wear layer of the pad is relatively soft compared to a harder inner wear layer. The outer wear layer wears away at a relatively rapid rate during initial wear-in of the head carrier. In this manner the head pole piece, which extends into the wear pad, is rapidly put into contact with the disk, thereby compensating for initial misalignment of the wear pad with the surface of the disk. In the preferred embodiment, both the outer and inner wear layers are formed of essentially amorphous carbon, with the inner layer being doped with various amounts of hydrogen to control wear resistance. In another embodiment the two layers are formed as an essentially single continuous layer, with the hydrogen concentration increasing or decreasing across the thickness of the layer.

For a fuller understanding of the nature and advantages of the present invention, reference should be made to the following detailed description taken in conjunction with the accompanying drawings.

DESCRIPTION OF THE PREFERRED EMBODIMENTS

Figure 1:
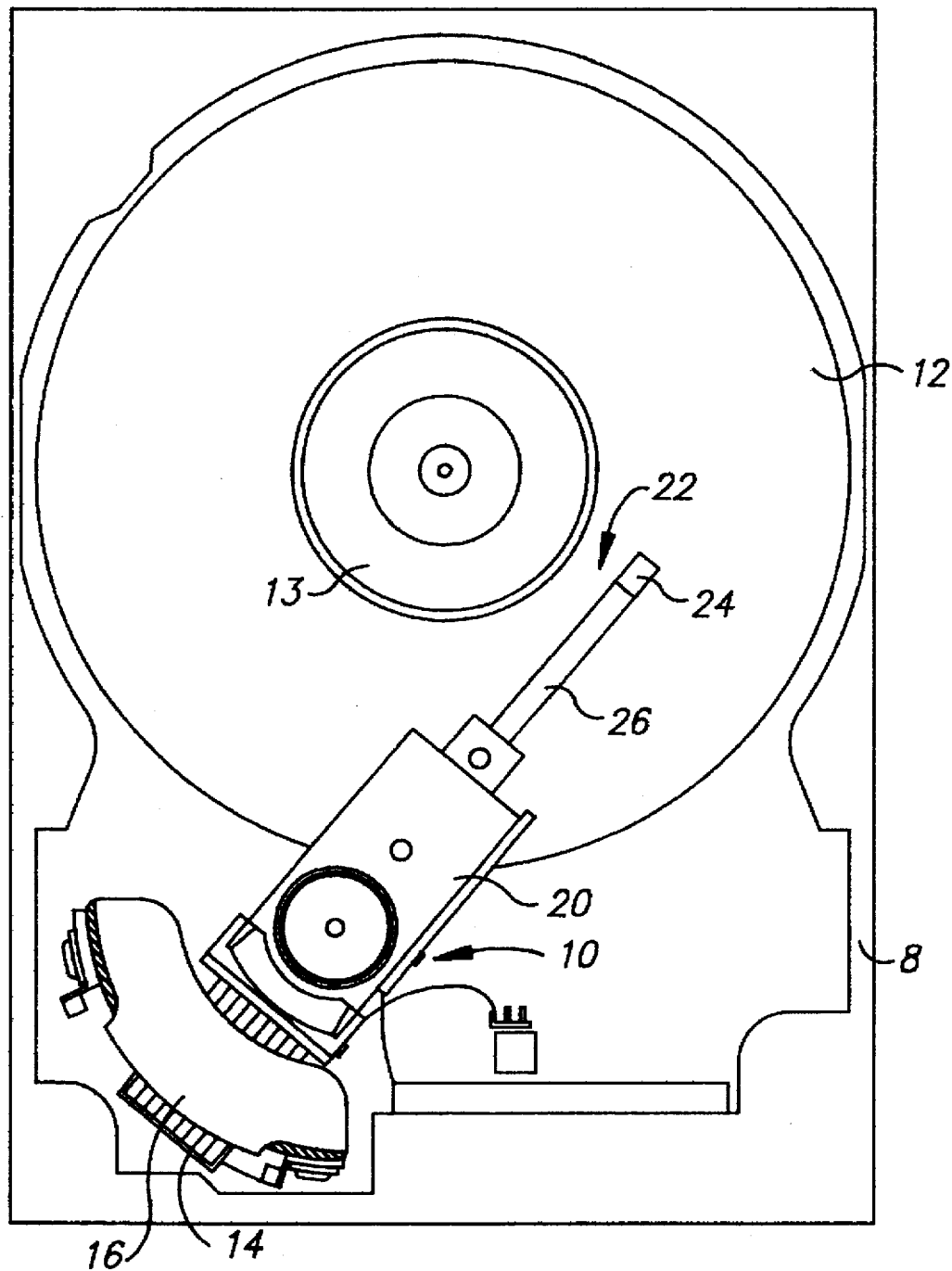
FIG. 1 is a top view of the contact recording disk file with the cover removed for illustrating schematically the major components.

FIG. 1 illustrates a contact recording disk file including a housing 8 in which is mounted a rotary actuator 10, and an associated magnetic storage disk 12 mounted on a spindle 13 which is rotated by a drive motor (not shown) mounted to housing 8. The rotary actuator 10 moves the head-suspension assembly of the present invention in an arcuate path across the disk 12. The rotary actuator 10 includes a voice coil motor (VCM), which comprises a coil 14 movable within the magnetic field of a fixed permanent magnet assembly having a core 16. An actuator arm 20 is attached to the movable coil 14. The other end of the actuator arm 20 is attached to a combination head-suspension assembly 22 of the present invention. The single-piece head-suspension assembly 22 includes a head-carrier segment 24 and a suspension section 26. Although head-suspension assembly 22 is depicted as a unitary body, it may also be of a two-piece construction where the carrier segment 24 is joined to the suspension section 26. The suspension section 26 can support the head-carrier segment 24 in contact with the surface of disk 12. The actuator arm 20 may include a plurality of arms with each arm supporting its own head-suspension assembly 22, each of which is associated with a surface of the disks located in the disk file. Therefore, for instance, the disk 12 can also have a head-suspension assembly 22 mounted to the actuator arm 20 for association with the media surface on the underside of disk 12. Further, other head-suspension assemblies may be mounted to actuator 10 for accessing associated top and bottom sides of other disks which may be included in the disk file.

The suspension section 26 of the head-suspension assembly 22 provides a load to the head-carrier segment 24 which is generally perpendicular to the surface of disk 12. This perpendicular load maintains the head-carrier segment 24 in contact with the data surface of disk 12 during rotation of the disk 12.

Figure 2:
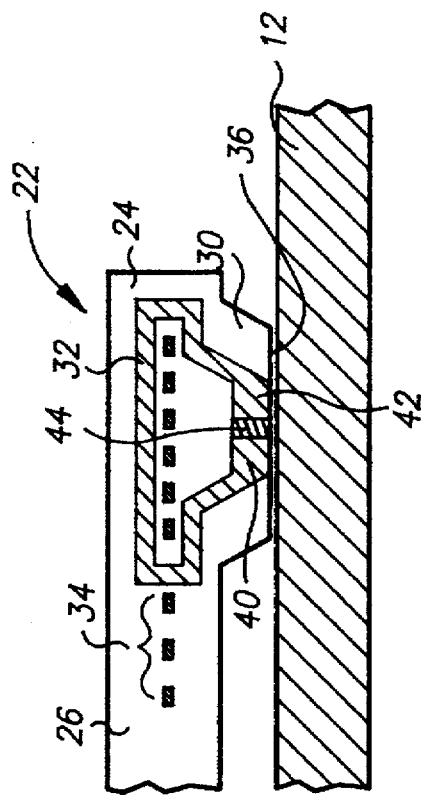
FIG. 2 is a side-section view of the integrated head-suspension assembly and disk illustrating the interface between the head carrier and the disk.

Referring now to FIG. 2, the head-suspension assembly 22, which includes suspension section 26 and head-carrier segment 24, is shown in an enlarged sectional view and in contact with the surface or magnetic recording disk 12. The head carrier 24 of head-suspension assembly 22 has on the end facing disk 12 a wear pad 30. As illustrated in the sectional view, the head carrier 24 has embedded within it an inductive read/write head which includes a pole piece (made up of pole tips 40, 42), a yoke 32, and a horizontally-oriented coil 34. The pole piece comprises adjacent pole tips 40,42 which are spaced apart to define a magnetic recording gap 44. In the embodiment depicted in FIG. 2, the head carrier 24 is formed as a single piece and is integrated with the suspension 26. However, it is possible that the head carrier 24 can be fabricated as a separate segment, referred to as a "chiplet" and attached to a separate suspension. Also, while in the embodiment depicted in FIG. 2 the pole piece is part of an inductive read/write head, the head carrier 24 with wear pad 30 is also usable with other types of magnetic recording heads, such as heads wherein the pole pieces are vertical recording probes (as described in the cited '932 patent), magnetoresistive (MR) sensors with their associated shields, or magnetic flux guides for directing the magnetic flux from the disk to the MR sensor.

Figure 3:
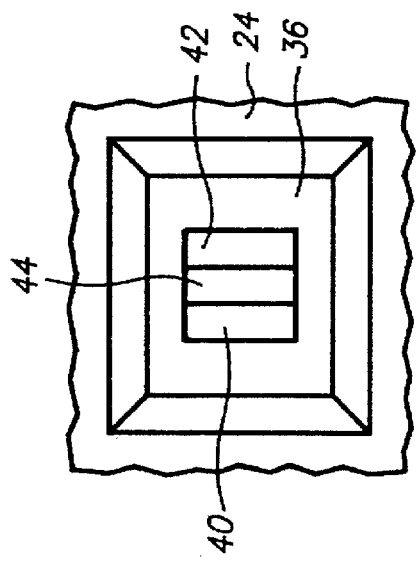
FIG. 3 is a view of the bottom or disk side of the wear pad of the head carrier depicted in FIG. 2.

FIG. 3 is an illustration of the end of wear pad 30 which faces disk 12. The end of wear pad 30 has a wear surface 36 which is essentially coplanar with the ends of pole tips 40, 42. During operation of the disk file, the wear pad 30, in particular the wear surface 36, is maintained in contact with the surface of disk 12 and partially wears away over the lifetime of the disk file. The structure of the inductive read/write head, including yoke 32 and coils 34, and their method for fabrication as part of the integrated head-suspension assembly 26, is described in further detail in the assignee's copending application Ser. No. 07/932,826.

Figure 4:
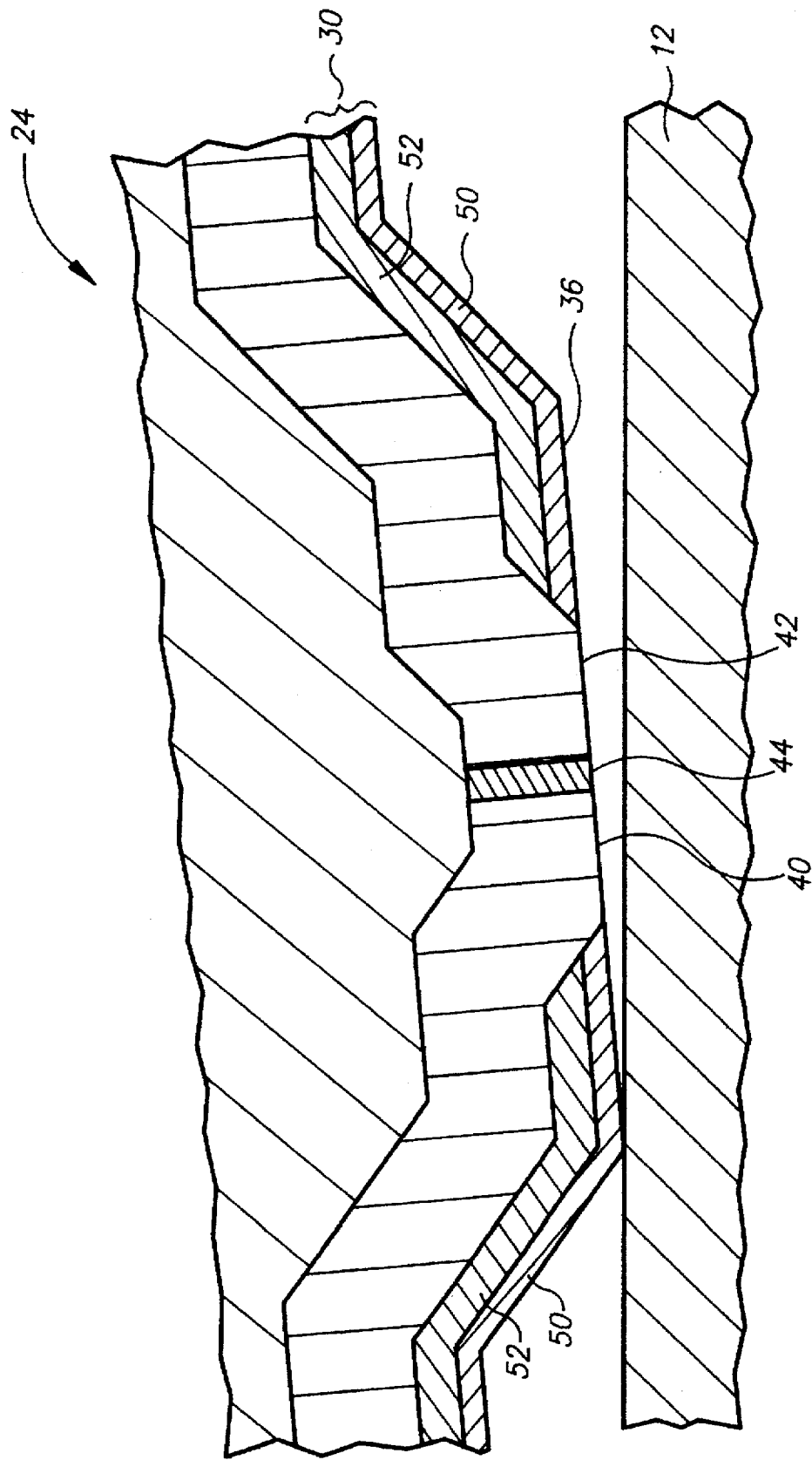
FIG. 4 is an enlarged sectional view of the wear pad and pole piece of the head carrier in initial misalignment with the surface of the disk.

Referring now to FIG. 4, the head-carrier assembly 24 is shown in an enlarged view in a position so as to be initially misaligned with the disk 12. As shown, because of this initial misalignment, the pole tips 40, 42 are not in contact with the surface of disk 12 and only a portion of the wear surface 36 of wear pad 30 is in contact with the surface of disk 12. In accordance with the present invention, the wear pad 30 comprises two layers: a first outer layer 50, and a second inner layer 52 which is in contact with layer 50 and which has a wear resistance significantly higher than that of outer wear layer 50.

In the preferred embodiment of head carrier 24, both outer layer 50 and inner layer 52 are formed of amorphous carbon by sputtering from a graphite target or by plasma-enhanced chemical vapor deposition (PECVD). Doping of these layers with variable amounts of hydrogen is used to adjust wear resistance and hardness of these layers. Generally, either low or high levels of doping lead to low wear resistance and hardness while an intermediate, optimized level of doping results in the best wear resistance and hardness. In the case of PECVD amorphous carbon, low-level hydrogen doping generally means less than approximately 15 atomic percent (at %), intermediate level means approximately 15 to 35 at %, and high level means above approximately 35 at %. When both layers are formed by PECVD or by sputtering, the first outer layer 50 is deposited with low or high levels of dopant and the second inner layer 52 is prepared with an intermediate level of hydrogen. Other dopants which alter wear resistance and hardness of the wear layer, such as nitrogen, can also be used. Alternatively, one layer can be formed by sputtering while the second layer can be deposited by PECVD. Other vacuum deposition techniques, such as ion beam deposition and electron cyclotron resonance, can be substituted for sputtering or PECVD. The outer layer 50 has a thickness preferably in the range of 0.1 to 1.0 micron and the inner layer 52 has a thickness preferably in the range of 1 to 10 microns.

With the wear pad 30 of the head carrier 24 according to the present invention, the outer layer 50 wears significantly faster than the inner layer 52 and provides a relatively quick alignment and initial contact of pole pieces 40, 42 with the surface of disk 12. Thus, during fabrication, only a relatively brief initial wear-in is required to cause the pole tips 40, 42 to come into contact with the disk surface 12. Following the initial wear-in of outer wear layer 50, the inner layer 52 provides the wear resistance for the head carrier 24 during the operational life of the disk file.

Figure 5A:
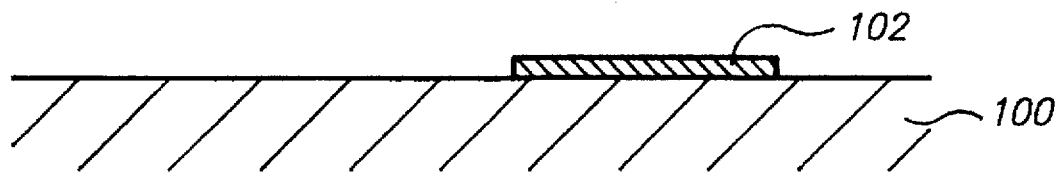
FIGS. 5A–5F are illustrations of the integrated head-suspension assembly with head carrier during steps in the fabrication process.
Figure 5B:
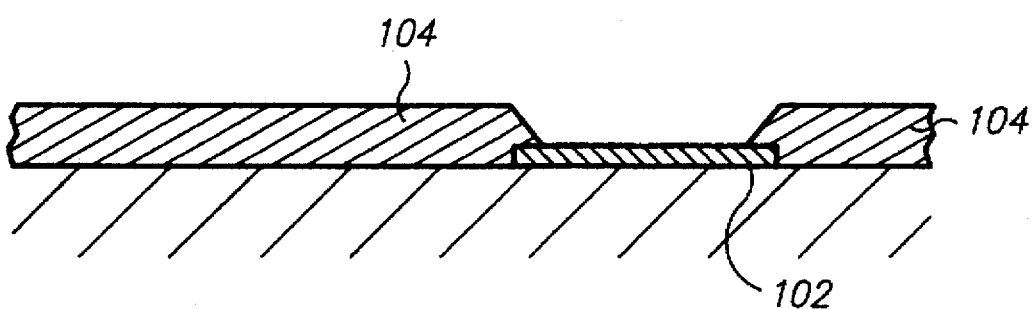

The preferred method of manufacturing the integrated head-suspension assembly 22 with the head carrier 24 will now be explained with reference to FIGS. 5A–5F. First, as shown in FIG. 5A, a suitable substrate 100, such as silicon or aluminum oxide/titanium carbide ceramic, has a patterned etch stop 102 formed on it. The etch stop material is preferably a thin layer of chromium or tantalum formed by sputter deposition or evaporation. Next, as shown in FIG. 5B, an alumina ($Al_2O_3$) layer 104 is deposited onto substrate 100 to a thickness equal to the desired height of wear pad 30 (see FIG. 2). Following the deposition of the alumina, a via is etched into the alumina down to the etch stop layer 102, which results in the structure shown in FIG. 5B. This creates a template for the subsequent formation of the wear pad. An alternate technique to create the template for the wear pad is to etch directly into the substrate 100 to create a depression for the wear pad. In this case, the height of the wear pad is determined by the depth of the etched depression.

Figure 5C:
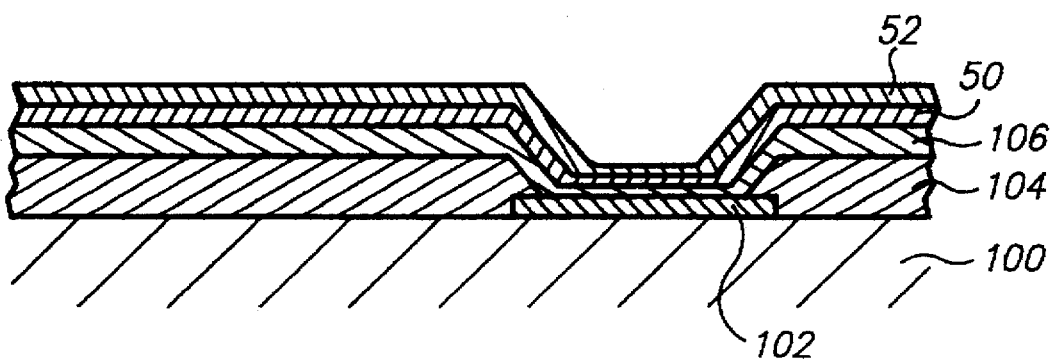

Referring now to FIG. 5C, the next step is the deposition of a release layer 106, preferably a material such as copper, to a thickness of approximately 2 microns. The outer wear layer 50 is then deposited onto release layer 106. In the preferred embodiment, the layer 50 is an essentially amorphous carbon film formed by PECVD and is formed to a thickness in the range of 0.1 micron to 1 micron. Next, the inner wear layer 52 is deposited onto the outer wear layer 50. The inner wear layer 52 is preferably formed by PECVD and is a film of essentially amorphous carbon doped with hydrogen. An organic source, such as cyclohexane, is present during the PECVD process to form the relatively hard carbon inner layer 52. The PECVD process may be further modified by a nitrogen doping. The inner layer 52 is preferably formed to a thickness of 1 to 10 microns.

Alternatively, the outer and inner wear layers 50, 52 can be formed by varying the hydrogen content of sputtered or PECVD carbon in each of the layers. Specifically, outer layer 50 is deposited carbon with a low or high level of hydrogen dopant concentration and inner layer 52 is deposited carbon having an intermediate concentration of hydrogen.

The wear layer 30 can also be formed by continuously varying the hydrogen content of the carbon during the period of deposition by PECVD or sputtering. Initially a high or low concentration of dopant is used to provide a low wear resistance in the outer layer, followed by a gradual change to an intermediate hydrogen concentration. This results in essentially a single continuous layer with a graded hardness and wear-resistant profile.

Alumina may also be used as the soft outer layer 50 in place of amorphous carbon.

Figure 5D:
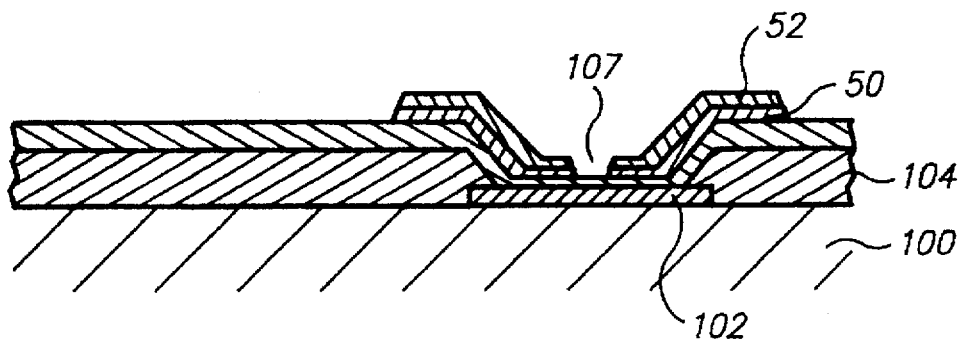

Referring now to FIG. 5D, portions of the wear layers 50, 52 are removed by reactive ion etching in areas outside of the subsequently formed head carrier 24 and in the central region 107 where the pole piece of the inductive read/write head will be formed.

Figure 5E:
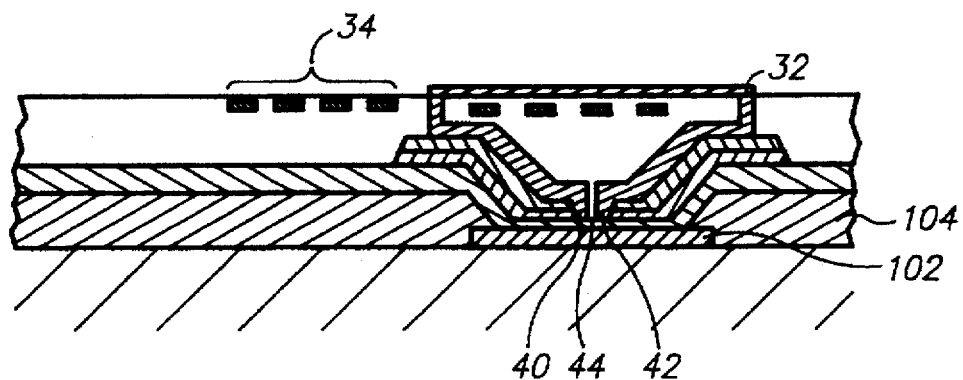

Next, as shown in FIG. 5E, the pole piece, including pole tips 40, 42, yoke 32, and coils 34, is formed. The yoke 32 and pole pieces 40, 42 are formed by depositing permalloy (NiFe). One pole piece 40 is deposited first and then a gap material, such as alumina or silica, is deposited isotropically. Unwanted gap material is removed by an anisotropic etch process, such as a reactive ion etch, so that gap material remains only on the vertical surfaces shown in FIG. 5E. Next, pole piece 42 is deposited adjacent to pole piece 40 but is now separated from it by gap 44. After formation of the pole tips 40, 42 and gap 44, the structure is covered with insulating polymers or inorganic materials, copper coils 34 are then electroplated, vias are opened to expose the bottom of yoke 32, and the top of yoke 32 is plated to complete the head structure.

Figure 5F:
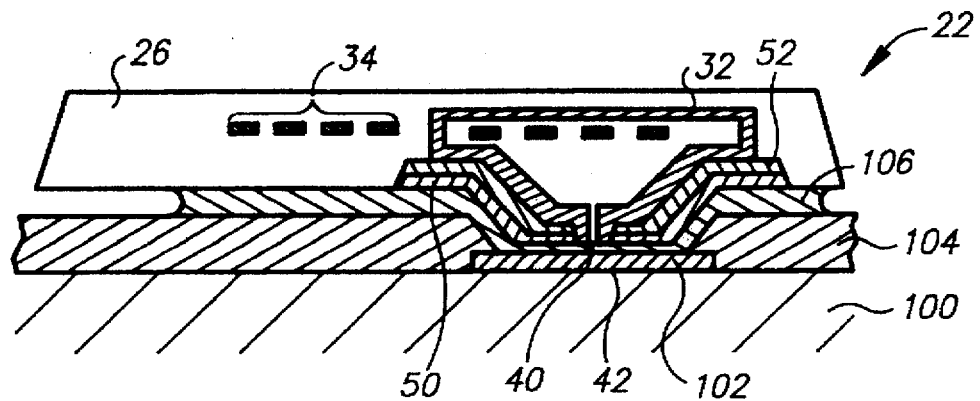

Following the formation of the inductive read/write head, alumina is next deposited, as shown in FIG. 5F, to the thickness desired for the suspension 26. Finally, the alumina layer 104 and the release layer 106 are etched in order to remove the completed head-suspension assembly 22 from the substrate 100 and the initial alumina layer 104.

The following Table 1 lists the experimentally determined wear rates for various materials which can be used in the wear pad. The data was obtained from a conventional 2.5-inch disk drive operating at 3600 RPM. The wear pad had a contact surface area of 35 microns×35 microns and was loaded onto a smooth carbon-overcoated and lubricated disk with a loading force of 20 mgmf. The local velocity of the disk under the wear pad was 10 m/sec.

TABLE 1

| Material | Initial Wear Rate | Long-term Wear Rate |
| --- | --- | --- |
| alumina | 3800 nm/day | 75 nm/day |
| sputtered carbon (4 at % hydrogen) | 150 nm/day | 13 nm/day |
| sputtered carbon (30 at % hydrogen) | 18 nm/day | 5 nm/day |
| PECVD carbon (33 at % hydrogen) | 6 nm/day | 2 nm/day |

By appropriate selection of the materials in Table 1 to create a dual layer, or by gradually varying the dopant content in amorphous carbon, such as by increasing the hydrogen concentration from the outer layer to the inner layer to provide an essentially continuous single-wear layer, it is possible to fabricate a wear pad which solves the problem of initial misalignment with the disk and achieves high wear resistance over the lifetime of the disk file.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A contact recording disk file comprising:

a rigid disk for the storage of data;

means connected to the disk for rotating the disk;

a carrier having a wear pad, the wear pad comprising a plasma-enhanced chemical vapor deposited or sputter-deposited homogenous outer wear layer and a plasma-enhanced chemical vapor deposited or sputter-deposited homogenous inner wear layer in contact with the outer layer and having a wear resistance greater than that of the outer layer;

a head supported within the carrier for reading or writing data on the disk, the head having a pole piece extending through the inner wear layer and into the outer wear layer;

means connected to the carrier for maintaining the wear pad of the carrier generally in contact with the disk during reading or writing of data by the head; and means connected to the carrier for moving the carrier and supported head across the disk.

2. The disk file according to claim 1 wherein the head comprises an inductive read/write head and wherein the pole piece comprises a pair of pole tips separated by a recording head gap.

3. The disk file according to claim 1 wherein the head comprises a vertical recording head and wherein the pole piece comprises a vertical recording probe.

4. The disk file according to claim 1 wherein the head comprises an inductive write head and a magnetoresistive read head, and wherein the pole piece comprises a magnetoresistive sensor and shields.

5. The disk file according to claim 1 wherein the head comprises a magnetoresistive read head having a magnetoresistive sensor, and wherein the pole piece comprises a flux guide for directing magnetic flux to the magnetoresistive sensor.

6. The disk file according to claim 1 wherein the wear pad outer layer is formed of essentially amorphous carbon having substantially no hydrogen.

7. The disk file according to claim 6 wherein the inner layer is formed of essentially amorphous carbon containing hydrogen.

8. The disk file according to claim 1 wherein the outer layer is formed of essentially amorphous carbon containing less than approximately 15 atomic percent hydrogen and wherein the inner layer is formed of essentially amorphous carbon containing approximately 15 to 35 atomic percent hydrogen.

9. The disk file according to claim 1 wherein the one layer is a sputter-deposited layer and the other layer is a plasma-enhanced chemical vapor deposited layer.

10. The disk file according to claim 1 wherein the outer layer is alumina.

11. The disk file according to claim 1 wherein the carrier and the means for maintaining the wear pad of the carrier in contact with the disk are formed as an integrated head-suspension assembly.

12. A head assembly for use in a contact recording rigid disk file comprising:

a carrier having a wear pad for contact with the disk, the wear pad comprising a plasma-enhanced chemical vapor deposited or sputter-deposited homogeneous outer wear layer and a plasma-enhanced chemical vapor deposited or sputter-deposited homogenous inner wear layer in contact with the outer layer and having a wear resistance greater than that of the outer layer; and a head supported within the carrier for reading or writing data on the disk, the head having a pole piece extending through the inner wear layer and into the outer wear layer.

13. The head assembly according to claim 12 wherein the head comprises an inductive read/write head and wherein the pole piece comprises a pair of pole tips separated by a recording head gap.

14. The head assembly according to claim 12 wherein the wear pad outer layer is formed of essentially amorphous carbon having substantially no hydrogen.

15. The head assembly according to claim 12 wherein the inner layer is formed of essentially amorphous carbon containing hydrogen.

16. The head assembly according to claim 12 wherein one layer is a sputter-deposited layer and the other layer is a plasma-enhanced chemical vapor deposited layer.

17. The head assembly according to claim 12 further comprising a suspension connected to the carrier.

18. The head assembly according to claim 17 wherein the carrier and suspension are formed as a single-piece integrated assembly.

* * * * *